(No Model.)
F. SCHARPF.
Optometer.
No. 236,911. Patented Jan. 25, 1881.
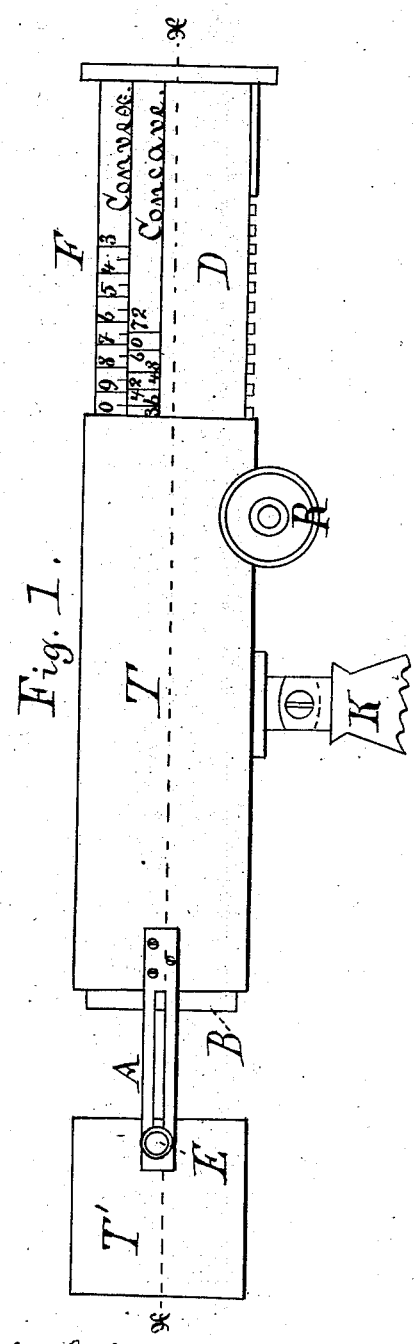
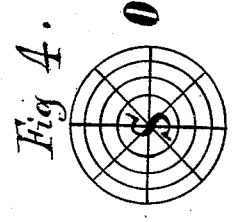
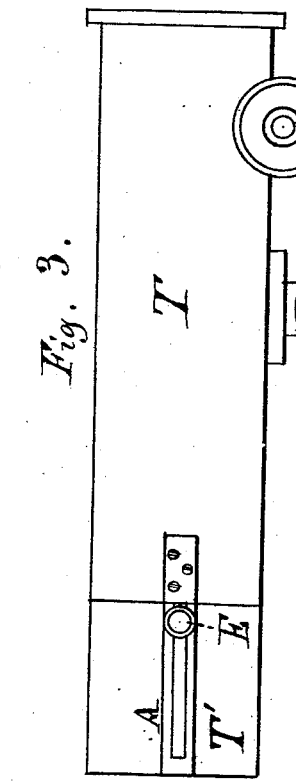
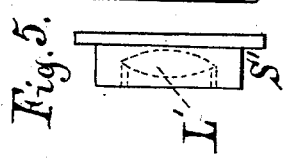
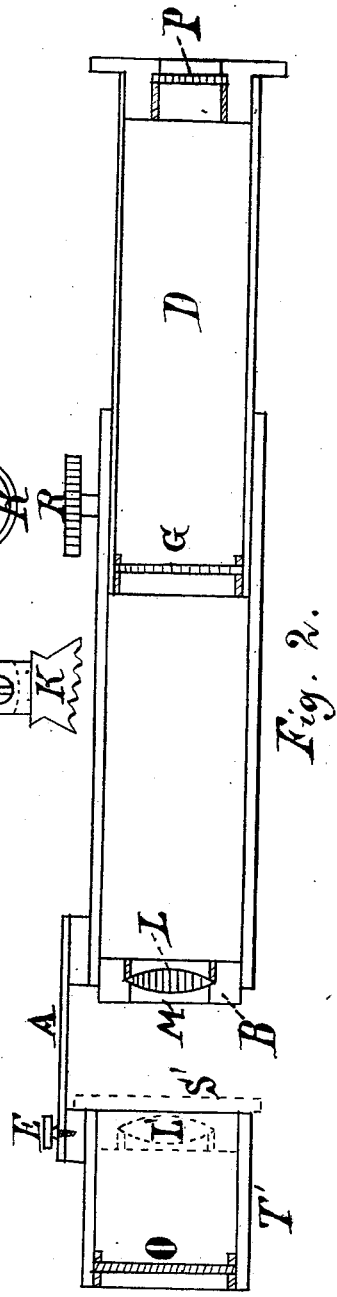
Witnesses:
Chas. W. Willcor
Geo. Smith
Inventor.
Frederic Scharpf

UNITED STATES PATENT OFFICE.

FREDERIC SCHARPF, OF ROCHESTER, NEW YORK.

OPTOMETER.

SPECIFICATION forming part of Letters Patent No. 236,911, dated January 25, 1881.

Application filed June 23, 1880. (No model.)

*To all whom it may concern:*

Be it known that I, FREDERIC SCHARPF, of the city of Rochester, county of Monroe, and State of New York, have made a new and useful Improvement in the Construction of Instruments for the Focal Measurement of Optical Lenses; and I hereby declare that the following is a full and exact description thereof, reference being had to the accompanying drawings and the letters marked on the same, of which—

Figure 1 represents a side elevation of the instrument when in use; Fig. 2, a sectional plan at the line $x\,x$ of Fig. 1; Fig. 3, a side elevation of the instrument if not in use. Fig. 4 represents the fixed stationary object O; Fig. 5, a frame with convex lens to assist in the measurement of concave lenses.

The "optofocimeter," as I call my invention, relates to improvements in instruments for the measurement of the focal length of optical lenses.

The object of my invention is the production of an instrument for this purpose simple in construction, not liable to get out of order from use, and capable of being employed in any kind of light.

In the instruments for measuring the focal lengths of lenses heretofore constructed it has been necessary to ascertain the distance from the instrument of some solid body toward which the apparatus was pointed when in use, and an image of which was formed on the focusing-glass. This necessitated the use of the instrument in a fixed position and with the aid of a strong light.

By employing a transparent object attached to the instrument at a fixed distance therefrom I am enabled to dispense with the necessity of ascertaining the distance of a solid body, and at the same time to construct an apparatus which is complete in itself, portable, and capable of being used when pointed in any direction, in any situation, and with any kind of light.

My invention consists in the attachment to the tube of the instrument, which is provided with a convex lens, a sliding focusing-glass, and a graduated scale, of a transparent, or partially transparent, object located at a fixed distance from the convex lens.

My invention also consists in certain details of the construction, having for their object the exclusion of dust from the apparatus.

My improved instrument for measuring the focal lengths of lenses is represented in the accompanying drawings, in which T is the main tube of the instrument; T', the tube which carries the transparent object O; L, the convex lens, and G the sliding focusing-glass, which is placed in the end of the tube D, provided with the graduated scale or scales F.

The main tube may be supported on a suitable standard, K, or the instrument may be simply held in the hand while in use.

At one end the tube T supports the collar or frame B, which contains the lens L. At the other end the tube D slides freely in the tube T and carries the focusing-glass G. The outer end of the tube D is closed by the plane glass P for the purpose of excluding dust. A convex lens may, if desired, be substituted for the plane glass P. One or more scales are graduated on the outside of the tube D.

The tube T', which contains the object O, is attached to that end of the tube T which is provided with the lens L by means of a slotted bar, A, and thumb-screw E. The length of the bar A determines the distance of the object from the lens L. The tube T' is provided with a glass plate, upon which any suitable object is painted or photographed.

In Fig. 4 I have represented an object as consisting of ring $s$, cross-lines, and the letter S; but it may be any suitable arrangement of lines or characters capable of producing a sharp and distinct image on the ground glass.

In order to measure the focal length of an optical lens, the tube T', carrying the object, is drawn out as far as the slotted bar A will allow, and fastened in place by means of the thumb-screw E. The lens whose focal length is to be measured is then placed in front of the aperture M, before the lens L, and, the instrument being pointed toward any convenient source of light, the tube D is moved backward and forward while the observer looks through the apparatus until a distinct image of the object O becomes visible upon the ground-glass screen G, in which case the focal length of the lens will be indicated on the scale F at the end of the tube T in inches or other measurements.

The tube D may be provided with a rackand-pinion movement, in which case it is adjusted by means of the hand-wheel R.

The drawing-tube D may be replaced by a common sliding tube, and a graduated bar may be attached to it in any convenient manner.

The convex lens L is employed for the purpose of shortening the focal lengths of the lenses to be measured, and to thus enable the operator to measure lenses of greater focal lengths than the tube T would permit without the lens. By this means lenses varying in focal lengths from three inches to seventy-two inches may be measured on an instrument of my construction not exceeding thirteen inches in length.

For the purpose of measuring concave lenses, the frame S' with convex lens L', Fig. 5, is provided and adjusted to the tube T', as shown by dotted lines in Fig. 2, in order to neutralize the concavity of such lenses, and to insure the production of a positive image on the semi-transparent plate G. The frame S' and lens L' may be readily removed when not required.

On the outside of the tube D one or more scales, F, are marked, one of the scales being intended for the measurement of convex lenses and one for concave lenses.

When the instrument is closed up, by bringing the tube T' in contact with the tube T, as shown in Fig. 3, dust is entirely excluded from the object O and the lens L. The plane glass P also prevents the access of dust to the focusing-glass G.

In order to obtain a fixed standard of measurement, I base the graduations of the scale F on the measurement of lenses by direct sunlight.

My improved apparatus can be used as well at night, by an artificial light, as by daylight.

I hereby disclaim anything shown or described in the patent of Lomb and Scharpf, No. 196,028, October 9, 1877.

I claim—

1. The combination of the fixed transparent object O, tube T, lens L, adjustable focusing-glass G, and graduated scale F, substantially as and for the purposes set forth.

2. The combination of the tube T, lens L, fixed transparent object O, and the sliding tube D, having focusing-glass G at its inner end and plane glass P at its outer end, substantially as described.

3. In combination with the tube T of a focus-measuring instrument, the object-carrying tube T' and slotted bar A, substantially as described.

FREDERIC SCHARPF.

Witnesses:
CHAS. W. WILBOR,
GEO. SMITH.